United States Patent
Lee et al.

(10) Patent No.: US 11,535,974 B2
(45) Date of Patent: Dec. 27, 2022

(54) MULTI-FUNCTIONAL STORAGE SYSTEM COMPRISING A RECIRCULATION MODULE

(71) Applicant: COWAY CO., LTD., Gongju-si (KR)

(72) Inventors: Dong Hun Lee, Seoul (KR); Gyeongcheol Sin, Seoul (KR); Byung Soo Yun, Seoul (KR); Jin Min Kim, Seoul (KR); Sung Hwan Heo, Seoul (KR); In Kyu Back, Seoul (KR); Hyo Sung Kim, Seoul (KR); Hyun Kuk Choi, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 64 days.

(21) Appl. No.: 17/053,610

(22) PCT Filed: Mar. 26, 2019

(86) PCT No.: PCT/KR2019/003489
§ 371 (c)(1),
(2) Date: Nov. 6, 2020

(87) PCT Pub. No.: WO2019/216547
PCT Pub. Date: Nov. 14, 2019

(65) Prior Publication Data
US 2021/0071345 A1   Mar. 11, 2021

(30) Foreign Application Priority Data

May 8, 2018   (KR) .................. 10-2018-0052687

(51) Int. Cl.
*D06F 58/10*   (2006.01)
*D06F 58/26*   (2006.01)
(Continued)

(52) U.S. Cl.
CPC .............. *D06F 58/10* (2013.01); *A47B 61/00* (2013.01); *A47B 95/00* (2013.01); *B01D 46/00* (2013.01); *B01D 46/42* (2013.01); *D06F 73/02* (2013.01)

(58) Field of Classification Search
CPC ........ B01D 46/00; B01D 46/42; A47B 95/00; A47B 61/00; D06F 73/02; D06F 58/10
See application file for complete search history.

(56) References Cited

U.S. PATENT DOCUMENTS 2,499,328 A  *  2/1950  Women ................... D06F 58/10
                                                        34/80
3,672,188 A  *  6/1972  Geschka ................. D06F 17/04
                                                        68/12.22
(Continued)

FOREIGN PATENT DOCUMENTS

JP           2009-183588 A    8/2009
KR     10-2005-0096037 A     10/2005
(Continued)

OTHER PUBLICATIONS

Extended European Search Report dated Dec. 10, 2021 in corresponding European Patent Application No. 19800564.7 citing document AO therein, 8 pages.
(Continued)

*Primary Examiner* — Benjamin L Osterhout
(74) *Attorney, Agent, or Firm* — Oblon, McClelland, Maier & Neustadt, L.L.P.

(57) ABSTRACT

A multi-functional storage system, provided with both an air cleaning function and a clothing management function, includes a storage room, a machine room positioned on and in fluid communication with one side of the storage room, and a recirculation module positioned on and in fluid communication with a recirculation module mounting part, which is an opening positioned on the other side of the
(Continued)

storage room. The recirculation module, to improve circulation performance, includes a recirculation module frame covering the recirculation module mounting part, an air shot hanger mounted on the recirculation module frame, a plurality of recirculation intake ports positioned on the recirculation module frame, a plurality of recirculation discharge ports positioned on the recirculation module frame, and an air shot discharge port positioned on a bottom surface of the air shot hanger.

11 Claims, 9 Drawing Sheets

(51) Int. Cl.
| | | |
|---|---|---|
| *D06F 58/20* | (2006.01) | |
| *A47B 95/00* | (2006.01) | |
| *A47B 61/00* | (2006.01) | |
| *B01D 46/42* | (2006.01) | |
| *B01D 46/00* | (2022.01) | |
| *D06F 73/02* | (2006.01) | |

(56) References Cited

U.S. PATENT DOCUMENTS

| | | | |
|---|---|---|---|
| 5,815,961 A * | 10/1998 | Estes | D06F 73/02 |
| | | | 38/14 |
| 6,189,346 B1 * | 2/2001 | Chen | D06F 73/02 |
| | | | 68/5 R |
| 8,006,336 B1 * | 8/2011 | Gerlach | B05B 5/03 |
| | | | 68/5 R |
| 8,695,228 B2 | 4/2014 | Lee et al. | |
| 8,997,372 B2 * | 4/2015 | Cennon | D06F 58/10 |
| | | | 68/3 R |
| 9,091,015 B2 * | 7/2015 | Caldeira | D06F 58/206 |
| 9,359,710 B2 * | 6/2016 | Lee | D06F 58/12 |
| 10,151,059 B1 * | 12/2018 | Tsai | D06F 57/08 |
| 2002/0133969 A1 * | 9/2002 | Cassella | D06F 34/26 |
| | | | 34/201 |
| 2003/0126691 A1 * | 7/2003 | Gerlach | D06F 58/10 |
| | | | 8/158 |
| 2004/0112095 A1 * | 6/2004 | Bolduan | D06F 58/10 |
| | | | 68/184 |
| 2004/0134087 A1 * | 7/2004 | Meyer | D06F 58/10 |
| | | | 34/103 |
| 2004/0206131 A1 * | 10/2004 | Kleker | D06F 18/00 |
| | | | 68/205 R |
| 2005/0050762 A1 * | 3/2005 | Hood | D06F 58/203 |
| | | | 34/595 |
| 2009/0126422 A1 * | 5/2009 | Kim | D06F 58/203 |
| | | | 68/5 C |
| 2009/0235464 A1 * | 9/2009 | Cassidy | D06F 17/04 |
| | | | 68/28 |

FOREIGN PATENT DOCUMENTS

| | | |
|---|---|---|
| KR | 10-2006-0060211 A | 6/2006 |
| KR | 10-0672490 B1 | 1/2007 |
| KR | 10-0672491 B1 | 1/2007 |
| KR | 10-2008-0004028 A | 1/2008 |
| KR | 10-2008-0105499 A | 12/2008 |
| KR | 10-2010-0121201 A | 11/2010 |
| KR | 10-1083106 B1 | 11/2011 |
| KR | 10-2013-0094923 A | 8/2013 |
| KR | 10-2014-0003984 A | 1/2014 |
| KR | 10-1443316 B1 | 9/2014 |
| KR | 10-1498035 B1 | 3/2015 |
| KR | 10-2017-0100151 A | 9/2017 |

OTHER PUBLICATIONS

International Search Report dated Jul. 5, 2019 in PCT/KR2019/003489 filed on Mar. 26, 2019, citing documents AA and AJ-AN therein, 2 pages.

* cited by examiner

MULTI-FUNCTIONAL STORAGE SYSTEM COMPRISING A RECIRCULATION MODULE

TECHNICAL FIELD

The present invention relates to a multi-functional storage system provided with both an air cleaning function and a clothing management function, wherein the multi-functional storage system includes a separate recirculation module to improve circulation performance.

BACKGROUND ART

Various technologies have been developed in order to additionally provide a separate mechanical device inside a cabinet for storing various items (e.g., clothes, shoes, and blankets), wherein the mechanical device is provided to remove contaminants or malodorous substance and to improve creases. One of these is to use the high-temperature humid air. This is because the high-temperature humid air can absorb contaminants or malodorous substances from clothes, etc.

Korean Laid-open Patent Application No. 10-2008-0004028 adopts a method for spraying steam directly or indirectly onto clothes, etc. However, the use of the steam is accompanied with the shortcomings such as a problem that clothes are damaged due to temperatures rising up to 100° C., a user safety problem due to inadvertent door opening, a problem of noises generated from a pump or heat exchanger employed to generate a large amount of steam, a need for a large tank capacity, a need for a large amount of water which leads into a problem of frequent water supply and a large amount of drainage, etc.

A closed loop system may be used to achieve the atmosphere of a hot humid air inside the cabinet. By isolating the cabinet from the outside, a high temperature and high humidity atmosphere is quickly formed. However, a technology may be used, in which the system is switched into an open loop system when the temperature and humidity reach certain levels, discharging odors or the like in the cabinet to the outside, and supplying fresh outside air to the inside to prevent re-contamination due to odors or the like.

By using the open-loop system as well as the closed-loop system, there is an advantage that it is easy to discharge contaminants or malodorous substances to the outside of the cabinet, and that circulation performance is increased by controlling the location and opening/closing timing of the intake and exhaust ports. However, since odors may be discharged to the outside of the device, that is, into a room, a living room, and the like where a user stays, an expensive deodorizing filter or the like is required, and if the temperature in the cabinet is excessively increased due to the use of steam, a user safety problem occurs.

In view of this, it is desirable to maintain the closed-loop system continuously during a management of clothes or the like in the cabinet. In this case, the most critical concern is to increase the circulation performance. If circulation is not smooth or there is a space where an air is stagnant inside the cabinet, contaminants or malodorous substances contained in clothes or the like are not easily discharged, and it takes very long to improve clothes or the like to a desired level.

(Patent Literature 1) KR Patent Publication No. 10-0672490

(Patent Literature 2) KR Patent Publication No. 10-0672491

(Patent Literature 3) KR Patent Publication No. 10-1443316

(Patent Literature 4) KR Patent Publication No. 10-1498035

(Patent Literature 5) KR Patent Publication No. 10-1083106

(Patent Literature 6) Korean Laid-open Patent Application No. 10-2008-0004028

DISCLOSURE

Technical Problem

The present invention has been devised to solve the problems described above.

Specifically, in a multi-functional storage system which continuously maintains a closed-loop system and which is operated in a manner of removing contaminants or malodorous substances from clothes or the like with only a circulation air and without requiring an outside air, the multi-functional storage system can remove contaminants or malodorous substances more efficiently by improving the circulation performance of a circulation air and preventing generation of a space where air flow is stagnant inside the storage room, while still using a blower of the same performance.

Technical Solution

In an embodiment of the present invention for solving the problems described above, a multi-functional storage system is provided, which may include: a storage room 100; a machine room 200 positioned on and in fluid communication with one side of the storage room 100; and a recirculation module 300 positioned on and in fluid communication with a recirculation module mounting part 130, which is an opening positioned on the other side of the storage room 100, in which the recirculation module 300 further includes: a recirculation module frame 310 covering the recirculation module mounting part 130; an air shot hanger 350 mounted on the recirculation module frame 310; a plurality of recirculation intake ports 312 positioned in the recirculation module frame 310; a plurality of recirculation discharge ports 315 positioned in the recirculation module frame 310; and an air shot discharge port 355 positioned on a bottom surface of the air shot hanger 350.

In addition, it is preferable that the recirculation module 300 further include a recirculation flow path 330 which is an upper surface of the recirculation module frame 310 and the recirculation flow path 330 is in fluid communication with the recirculation intake port 312, the recirculation discharge port 315, and the air shot discharge port 355.

In addition, it is preferable that the recirculation module frame 310 include a parallel first surface positioned at a front side, and a second surface positioned at a rear side and bent downward, and the recirculation intake port 312 is positioned on the second surface.

In addition, it is preferable that the recirculation module 300 further include a recirculation blower unit 320 which is an interior of the recirculation flow path 330 and is positioned above the second surface, as an upper side of the recirculation intake port 312.

In addition, it is preferable that an upper surface of the recirculation flow path 330 be parallel from a front end to an end of the recirculation blower unit 320.

In addition, it is preferable that the recirculation module 300 further include an air shot hanger mounting part 340 which is protruded downward from the recirculation module frame 310, has a hollow shape, and which is communicated with a front end portion of the recirculation flow path 330, and the air shot hanger 350 is attachable to or detachable from the air shot hanger mounting part 340.

In addition, it is preferable that the air shot hanger 350 have an inverted Y shape, and the air shot discharge port 355 is provided in pairs and positioned to face downward at both ends of the inverted Y-shape, respectively.

In addition, it is preferable that air inside the storage room 100 be circulated as a circulation air through the machine room 200 and the recirculation module 300.

In addition, it is preferable that a circulation filter unit 229 and a heating unit 260 are positioned in the machine room 200, and when the multi-functional storage system is operated in a clothing management mode, while the storage room 100 is blocked from the outside air, the machine room 200 is heated by the heating unit 260 and then the air inside the storage room 100 is flowed into the machine room 200, supplied with moisture by the circulation filter unit 229 to become a natural humidified air, and then flowed back into the storage room 100 as the circulation air, and the recirculation module 300 is operated to recirculate the circulation air.

In addition, it is preferable that an intake port 210, an exhaust port 250, and a clean filter unit 219 are positioned in the machine room 200, and air flowed into the machine room 200 through the intake port 210 is filtered by the clean filter unit 219 and then discharged through the exhaust port 250.

In addition, it is preferable that, when the multi-functional storage system is operated in an air cleaning mode, the storage room 100 is blocked from the fluid communication with the machine room 200, and the operation of the recirculation module 300 is stopped.

Advantageous Effects

According to the present invention, in a multi-functional storage system that blocks the storage room from an outside air and uses only the circulation air to improve clothes, etc., the circulation performance is improved, the phenomenon of air stagnation does not occur, and the performance of improving clothes, etc. is greatly enhanced.

It is not necessary to excessively heat the interior of the storage room or supply excessive moisture such as steam in order to achieve the same performance. Accordingly, the power consumption and use of water are reduced, and since excessive operation of the pump is not required, noise is reduced.

It is possible to maximize the circulation performance by setting the intake port and the discharge port in different directions from each other.

Since the circulation air sucked for recirculation can be discharged through the air shot hanger, the air shot function can be implemented without requiring additional equipments, thereby effectively removing contaminants or malodorous substances from inside the clothes. An additional discharge port may be provided when there are no clothes hung on the air shot hanger or by detaching the air shot hanger.

The multi-functional storage system according to the present invention may also be used in an air cleaning mode. In this case, the recirculation module may be stopped to reduce power consumption or noise.

DETAILED DESCRIPTION OF THE INVENTION

Figure 1:
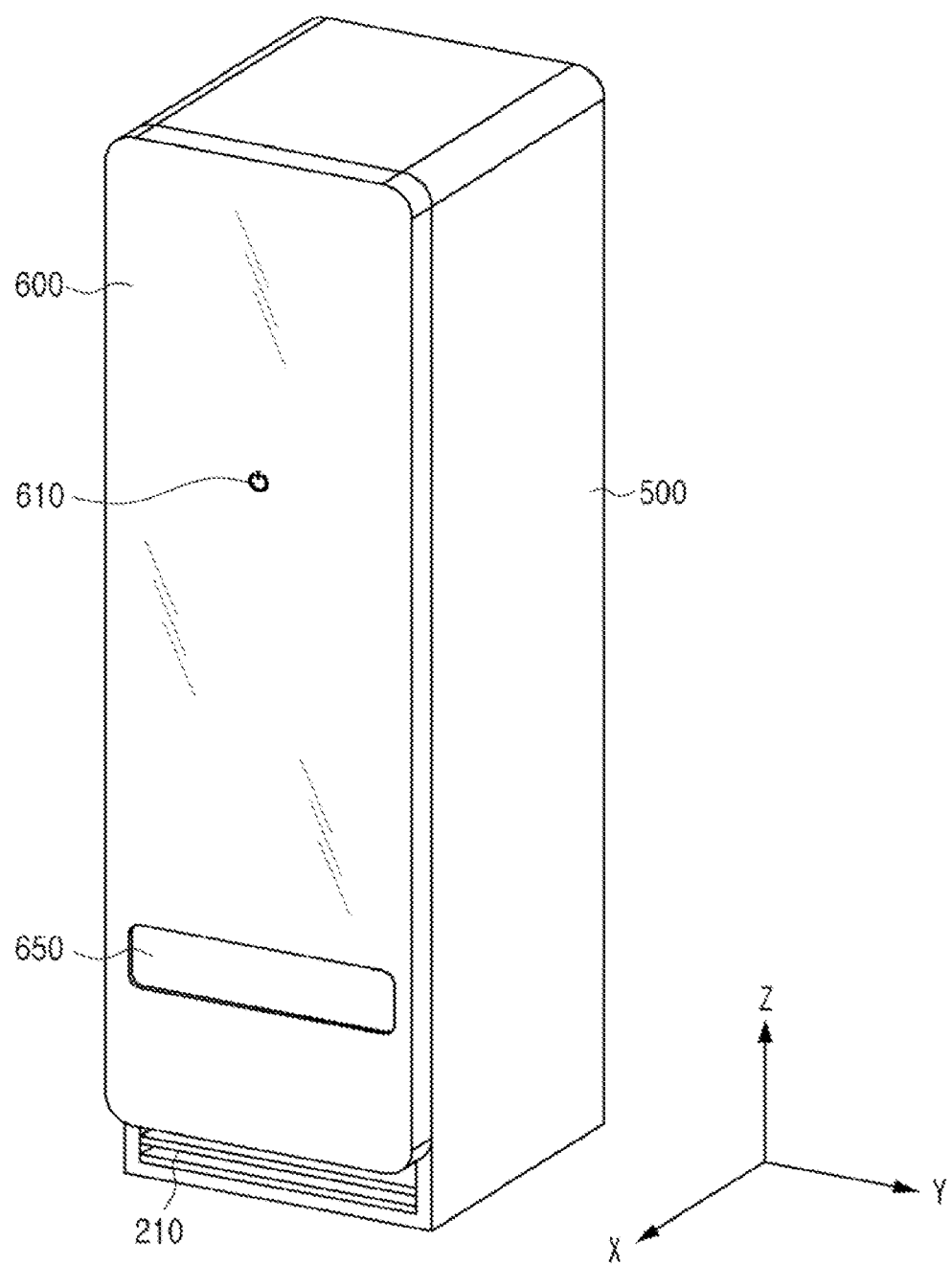
FIG. 1 is a perspective view showing an appearance of the multi-functional storage system according to the present invention.
Figure 2:
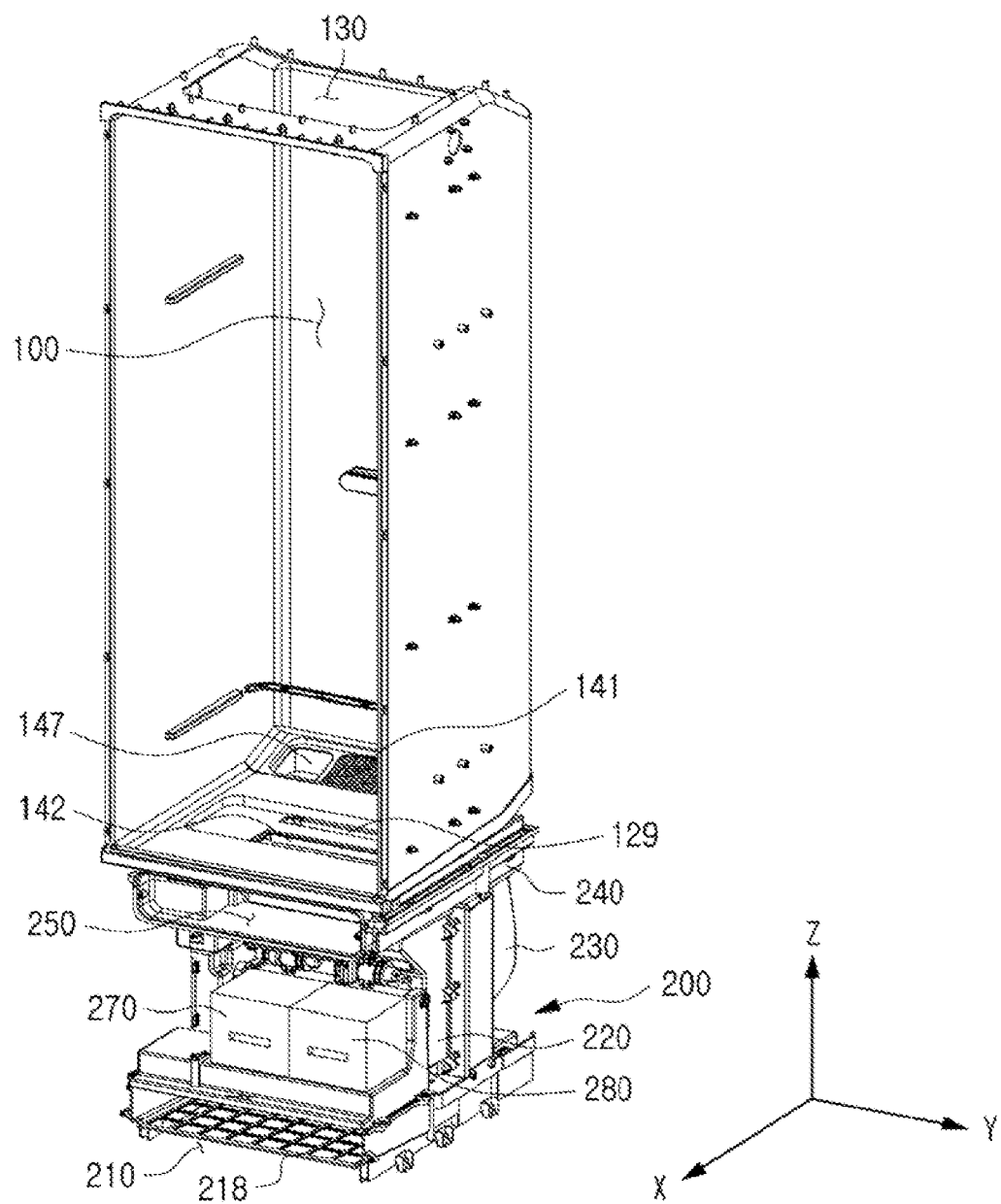
FIG. 2 is a perspective view showing an interior of the multi-functional storage system according to the present invention, from which the illustrations of a casing, a door, and a recirculation module are removed for the sake of explanation.
Figure 3:
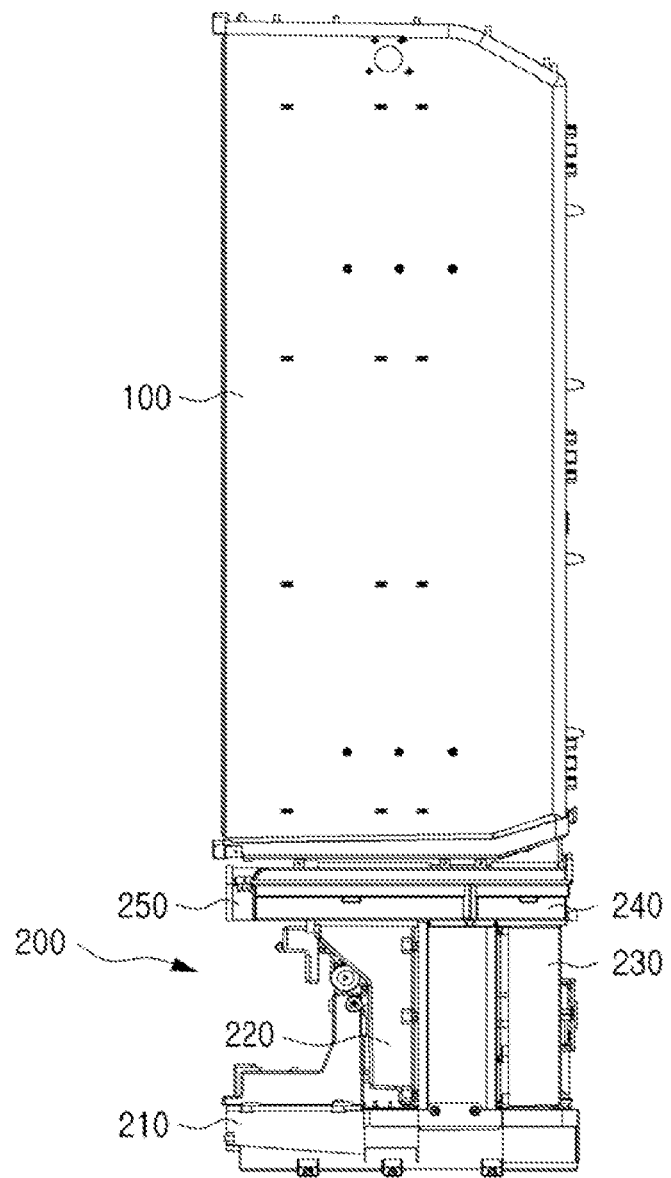
FIG. 3 shows a right side view of the interior of the multi-functional storage system according to the present invention.
Figure 4:
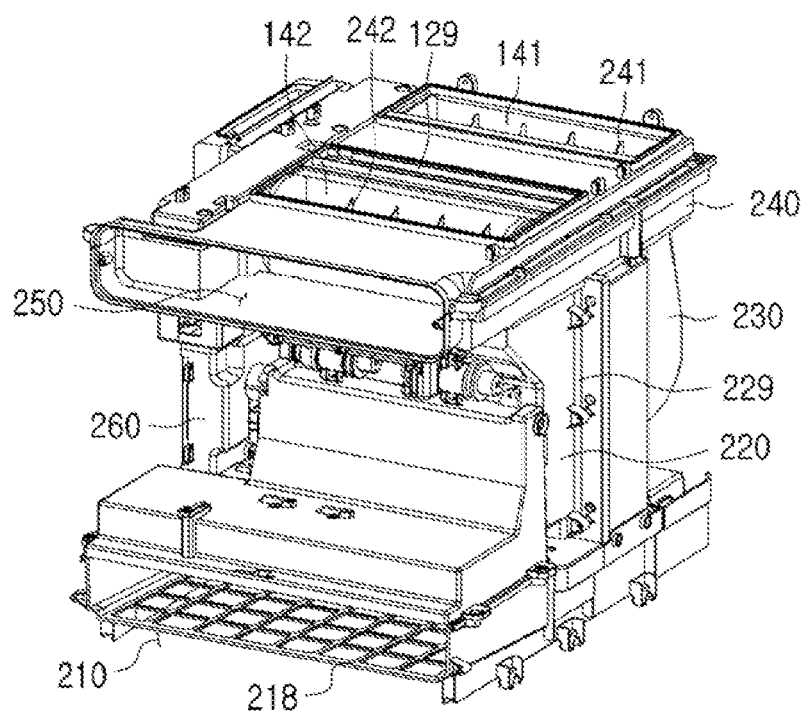
FIG. 4 is a perspective view showing an interior of the machine room of the multi-functional storage system according to the present invention.

Hereinafter, the multi-functional storage system according to the present invention will be described with reference to the drawings.

For explanation, terms such as front (X axis), back (−X axis), right (Y-axis), left (−Y axis), upward (Z axis), and downward (−Z axis) are used and the coordinate system is shown in the drawings, but these are merely for illustration, and the present invention is not limited to such directions.

Description of Structure of Multi-Functional Storage System

The multi-functional storage system according to the present invention will be described with reference to FIGS. 1 to 5.

The multi-functional storage system according to the present invention includes a storage room 100, a machine room 200, a recirculation module 300, a casing 500, and a door 600.

The storage room 100 is a space in which clothes or the like are stored to remove contaminants or malodorous substances. To this end, the temperature inside the storage room 100 may be increased to high temperature, and then a natural humidified air may be flowed thereinto as the circulation air and circulated. Details will be described below in connection with the operation mode.

When the storage room 100 is viewed from the inside, a circulation filter detaching part 129, a circulation air inlet 141, a circulation air outlet 142, and a functional material receiving part 147 are positioned on a lower surface.

The circulation filter detaching part 129 is an opening provided to allow a circulation filter unit 229 positioned in the machine room 200 to be easily detached for repair or replacement. The circulation air inlet 141 and the circulation air outlet 142 are openings through which a circulation air inside the storage room 100 flows in and out of the machine room 200, respectively. The functional material receiving part 147 is a space for storing a material for adding a function other than removing contaminants or malodorous substances from items such as clothes or the like stored in the storage room 100, and for example, aroma substances or the like may be accommodated therein and discharged to the storage room 100.

A recirculation module mounting part 130 on which the recirculation module 300 is mounted is positioned at an upper inner side of the storage room 100. The recirculation module 300 may include an air shot hanger 350 (see FIG. 8) having an air shot function.

Optionally, a hanger (not shown) may be positioned at a center of the upper inner side of the storage room 100, and a pants hanger (not shown) or the like may be further positioned on left and right inner wall surfaces.

The machine room 200 is a space for performing the air cleaning mode, and also a space for circulating an air in the air clothing management mode by introducing the air from the storage room 100 and filtering the same, and then emitting a natural humidified air as a circulation air.

The machine room 200 may be positioned in any directions with respect to the storage room 100, but preferably positioned under the storage room 100. This is because the condensate water condensed in the storage room 100 or a saturated humid air can be flowed into the machine room 200 by its own weight, and thus can be discharged to the outside through a condensate water reservoir 280.

The machine room 200 includes an intake port 210, a first flow path 220, a blower unit 230, a second flow path 240, an exhaust port 250, a heating unit 260, a supply water reservoir 270, and the condensate water reservoir 280.

The intake port 210 is a part that sucks an outside air into the machine room 200. It may be selected to open or close the intake port. For example, the intake port may be open during the air cleaning mode and closed during the clothing management mode. The location of the intake port 210 is preferably under the exhaust port 250, which will be described below, and more preferably, is at a lowermost end of the machine room 200. Since the intake port 210 is closed during the clothing management mode, the circulation flow path of the circulation air can be made simpler, and it is preferable that the door 600 do not reach the intake port 210.

A clean filter unit detaching part 218 may be positioned in the intake port 210, on which the clean filter unit 219 may be positioned. The clean filter unit 219 may serve to filter the outside air sucked in during the air cleaning mode, and may include a pre-filter, a HEPA filter, etc., but is not limited thereto.

The first flow path 220 is communicated with the intake port 210, the second flow path 230, and the blower unit 230. The outside air sucked in by the intake port 210 and then filtered during the air cleaning mode, and the circulation air sucked through the second flow path 230 during the clothing management mode are flowed into the first flow path 220.

The circulation filter unit 229 is positioned inside the first flow path 220. The circulation filter unit 229 may serve to filter the circulation air. Since the circulation filter unit 229 may include a humidification filter, when the water stored in the supply water reservoir 270 is supplied to the humidification filter, moisture is supplied while the circulation air passes therethrough, thereby forming a natural humidified air. The user may open the door 600 and access the circulation filter detaching part 129 to detach or attach the circulation filter unit 229.

An inlet side of the blower unit 230 is communicated with the first flow path 220 to provide power to suck an air into the first flow path 220. The outside air is sucked into the first flow path 220 by the operation of the blower unit 230 during the air cleaning mode, and an air inside the storage room 100 is sucked into the first flow path 220 as the circulation air during the clothing management mode. A discharge side of the blower unit 230 is communicated with the second flow path 240.

The second flow path 240 receives the filtered outside air or the circulation air from the blower unit 230. The second flow path 240 is selectively communicated with one of the storage room 100 and the exhaust port 250, and includes a first flow path switching member 241 and a second flow path switching member 242 for control purposes. The first flow path switching member 241 and the second flow path switching member 242 are paired and operated to change the flow path. In an embodiment, the first flow path switching member 241 and the second flow path switching member 242 may be members rotated along an axis, although any mechanism that can selectively change the flow path may be adopted.

Figure 5:
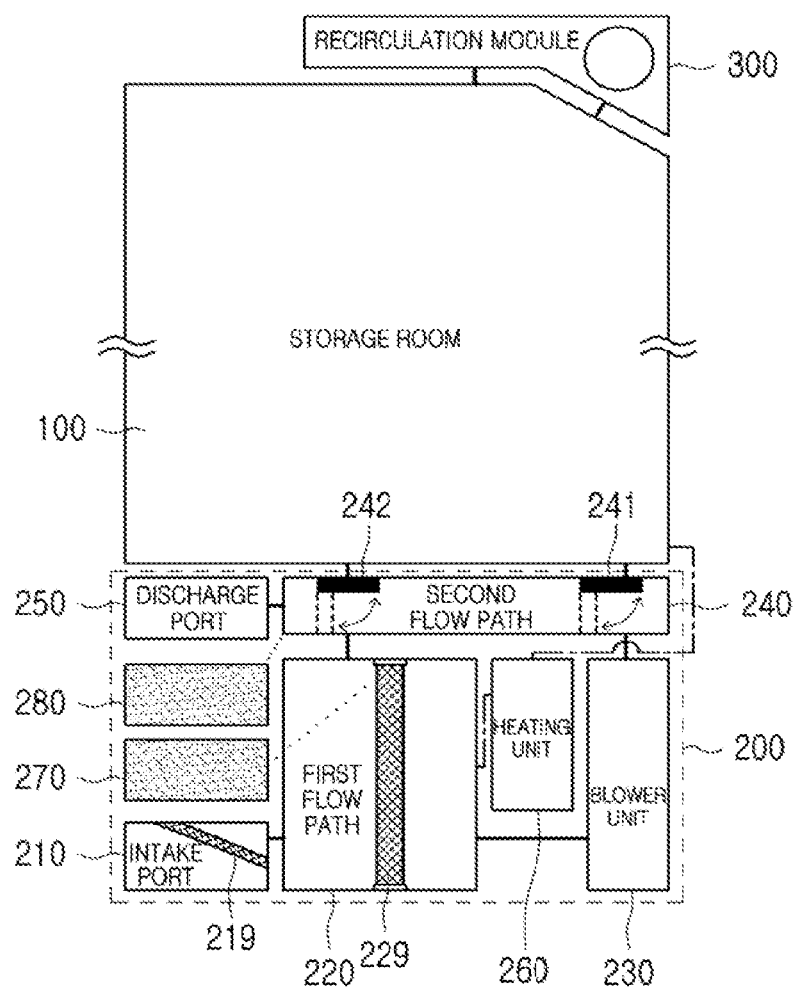
FIG. 5 is a conceptual diagram provided to explain the operation mode of the multi-functional storage system according to the present invention.
Figure 6:
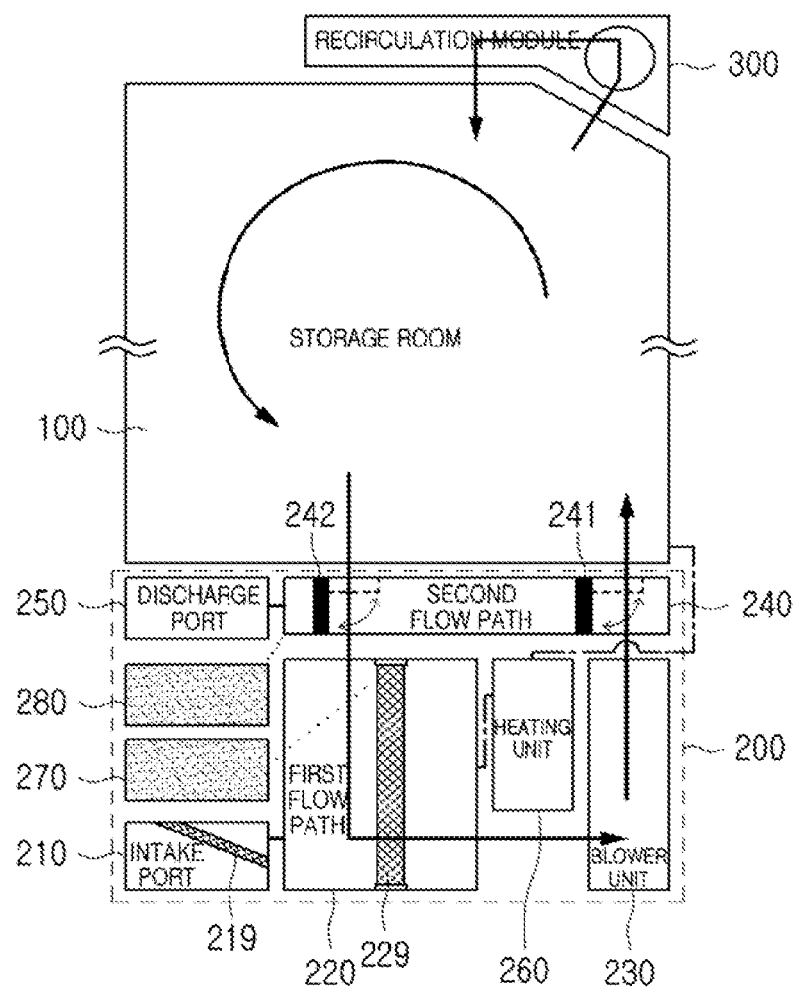
FIG. 6 is a conceptual diagram provided to explain the clothing management mode of the multi-functional storage system according to the present invention.

The first flow path switching member 241 and the second flow path switching member 242 cause the second flow path 240 to be blocked from the storage room 100 and communicated with the exhaust port 250 during the air cleaning mode (see FIGS. 5 and 7), and cause the second flow path 240 to be communicated with the storage room 100 and blocked from the exhaust port 250 during the clothing management mode (see FIG. 6). That is, the air circulates during the clothing management mode such that the circulation air of the second flow path 240 is flowed into the storage room 100 through the circulation air inlet 141 positioned above the first flow path switching member 241, and the circulation air inside the storage room 100 is flowed back to the second flow path 240 through the circulation air outlet 142 positioned above the second flow path switching member 242. Details are described below with reference to the operation mode.

The exhaust port 250 receives the filtered outside air from the second flow path 240 and discharges it to the outside. An exhaust door 650 may be positioned outside the door 600 that corresponds to the exhaust port 250 and open and close the exhaust port 250. For example, the exhaust door 650 may be opened such that the filtered outside air is discharged from the exhaust port 250 during the air cleaning mode, and the exhaust door 650 may be closed during the clothing management mode.

The heating unit 260 performs a function of heating the storage room 100. For example, it may be a heat pump, but is not limited thereto. During the air cleaning mode, after being heated to about 50° C. to 70° C. by the heating unit 260, the storage room 100 receives the circulation air from the second flow path 240 through the circulation air inlet 141, and performs the function of removing contaminants or malodorous substances from clothes or the like. It goes without saying that the temperature described above is an example, and thus is not limited thereto, and may be variously changed.

The supply water reservoir 270 stores water to be supplied to the humidification filter provided in the circulation filter unit 229. To this end, it is connected to the circulation filter unit 229 through tubing. The condensate water reservoir 280 may collect and store the condensate water generated in the storage room 100, or collect and store the condensate water generated in the process in which a saturated humid air generated in the storage room 100 is flowed into the first flow path 220 or the second flow path 240 of the machine room 200 and the like and condensed. To this end, it is connected to the storage room 100 and/or the first flow path 220 and/or the second flow path 220 through tubing.

In order to fill with the water or discard the filled condensate water, it is preferable that both the user's supply water reservoir 270 and the condensate water reservoir 280 be be easily accessed. To this end, the supply water reservoir 270 and the condensate water reservoir 280 are preferably positioned in front of the machine room 200, and the user is able to open the door 600 and easily remove them with a handle that is positioned in each of the reservoirs positioned under the exhaust port 250.

The recirculation module 300 serves to assist the recirculation of the circulation air in the storage room 100 during the air cleaning mode, and also assist direct drying of clothes or the like. Details will be described below.

The casing 500 forms the appearance of the multi-functional storage system.

The door 600 forms a front side of the multi-functional storage system, and a user can access the inside the storage room 100 by opening the door 600. When the user opens the door 600, in the storage room 100 portion, the inside of the storage room 100 is revealed, and in the machine room 200 portion, the exhaust port 250, the supply water reservoir 270, and the condensate water reservoir 280 are revealed. However, the door 600 does not cover the intake port 210. This is because the lowermost end of the door 600 is positioned above the intake port 210. This is to perform air cleaning even without opening the door 600 during the air cleaning mode.

A control unit 610 and an exhaust door 650 are positioned on an outer surface of the door 600. The control unit 610 includes an input unit through which the user can select the operation mode, and an output unit that can output a current operation state. The exhaust door 650 is communicated with the exhaust port 250 of the machine room 200 such that opening the exhaust door 650 alone may cause the filtered outside air to be discharged during the air cleaning mode without requiring opening of the door 600.

It is preferable that the door 600 be formed of a half-mirror. This is to provide convenience to the user, by directly showing the user the clothes or the like positioned inside the storage room 100 when necessary, and depending on situations, by also performing mirror function for the user who has taken out clothes or the like from the storage room 100.

Description of Operation Modes of Multi-Functional Storage System

Figure 7:
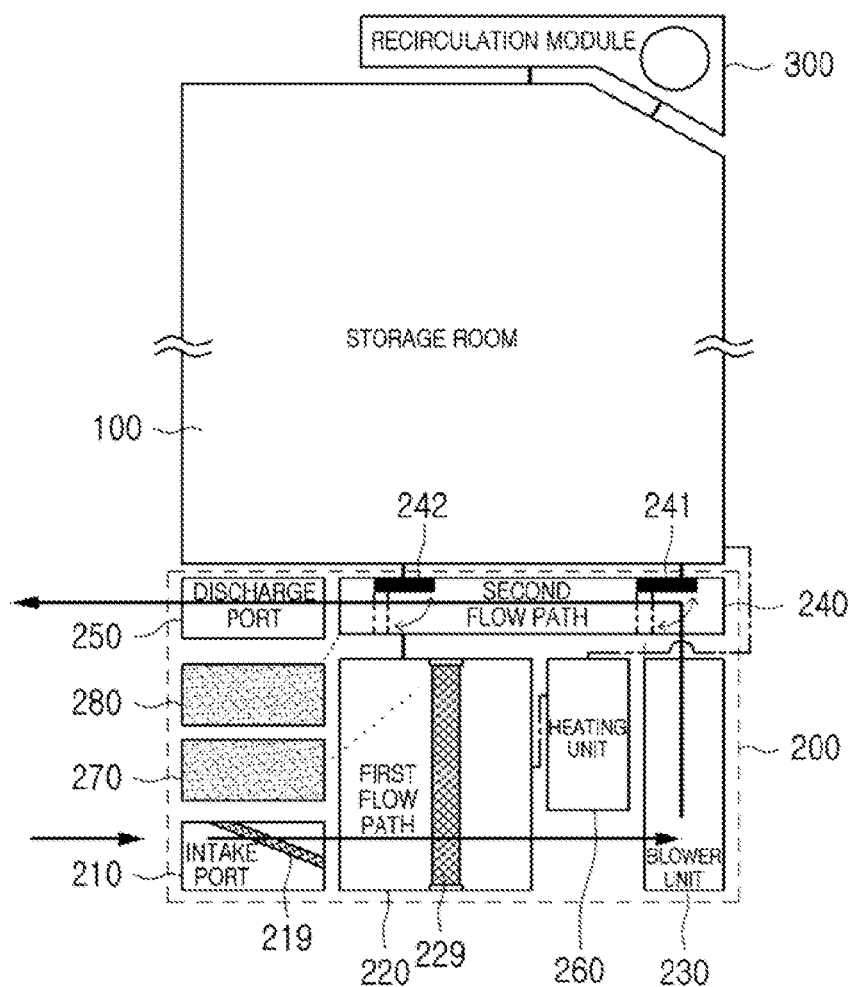
FIG. 7 is a conceptual diagram provided to explain the air cleaning mode of the multi-functional storage system according to the present invention.

The operation mode of the multi-functional storage system according to the present invention will be described with reference to FIGS. 5 to 7.

First, the "clothing management mode" will be described. Reference is made to FIG. 6.

The clothing management mode is a mode in which contaminants or malodorous substances are removed from clothes or the like positioned inside the storage room 100. After the temperature of the storage room 100 is increased by the heating unit 260, the inside of the storage room 100 is in a humid high-temperature environment with the circulation of the natural humidified air as the circulation air. Accordingly, contaminants or malodorous substances of clothes or the like are removed together with the high-temperature humid air, and the air is flowed into the machine room 200 and discharged as condensate water.

When the user selects the clothing management mode, the exhaust door 650 of the door 600 is closed and the intake port 210 is also closed. That is, in the clothing management mode, the air in the storage room 100 is not substantially discharged to the outside.

The heating unit 260 heats the storage room 100. It may be 50 to 70 degrees Celsius, but is not limited thereto. The first flow path switching member 241 and the second flow path switching member 242 of the machine room 200 are operated so that the second flow path 240 is communicated with the storage room 100 and the first flow path 220, and blocked from the exhaust port 250. Water from the supply water reservoir 270 is supplied to the humidification filter provided in the circulation filter unit 229 so that the humidification filter can retain moisture.

Simultaneously with heating, or after heating to a certain degree, the blower unit 230 is operated. With the operation of the blower unit 230, the air inside the storage room 100 is flowed into the second flow path 240 through the circulation air outlet 142, and is flowed back into the first flow path 220 and directed toward the blower unit 230. In this process, the air is passed through the humidification filter of the circulation filter unit 229 to become a natural humidified air. The air is again passed through the second flow path 240 to be supplied to the storage room 100 through the circulation air inlet 141.

As this process is repeated, the circulation air is continuously circulated between the storage room 100 and the machine room 200. The contaminants or malodorous substances may be entrained in the circulation air in the storage room 100, but since they are not discharged to the outside, a comfortable environment is provided to the user. In addition, once the circulation air including contaminants or malodorous substances is flowed into the machine room 200, it is filtered by the circulation filter unit 229, condensed into condensate water, and collected separately in the condensate water reservoir 280, so that the re-contamination phenomenon, in which the contaminants or malodorous substances are supplied back to the storage room 100, does not occur, which is desirable.

The recirculation module 300 assists the circulation of the circulation air. The recirculation module 300 recirculates the circulation air in the upper side of the storage room 100, so that the convection phenomenon is more smoothly performed throughout the storage room 100.

Next, the "air cleaning mode" will be described. Reference is made to FIG. 7.

The air cleaning mode is a mode in which only the machine room 200 is operated independently from the storage room 100 to perform a function of purifying the outside air. That is, it is an operation mode in which, when the outside air is contaminated, the outside air is prevented from being flowed into the storage room 100 because there may be clean clothes or the like positioned inside the storage room 100.

When the user selects the air cleaning mode, the exhaust door 650 of the door 600 is opened and the intake port 210 is also opened.

The first flow path switching member 241 and the second flow path switching member 242 of the machine room 200 are operated so that the second flow path 240 is communicated with the exhaust port 250, and blocked from the storage room 100 and the first flow path 220. In this process, the storage room 100 becomes a space independent from the machine room 200.

The blower unit 230 is operated. With the operation of the blower unit 230, the outside air is flowed into the first flow path 220 through the intake port 210 and is directed toward the blower unit 230. In the process of passing through the intake port 210, the outside air is filtered by the clean filter unit 219 positioned in the intake port 210. In the process of passing through the first flow path 220, the air may be further filtered by the circulation filter unit 229 positioned in the first flow path 220. At this time, the humidification filter positioned in the circulation filter unit 229 may or may not perform the humidification function according to the user's selection. When the outside air is humidified, the supply water reservoir 270 supplies water to the humidification filter, which is similar to the clothing management mode. The filtered outside air passed through the blower unit 230 is then passed through the second flow path 240 and exhausted to the outside through the exhaust port 250.

As this process is repeated, the multi-functional storage system according to the present invention performs a function as a kind of air purifier. The outside air is continuously flowed into the machine room 200 and filtered, and the filtered air is continuously exhausted.

It is preferable, since the air cleaning mode can be performed regardless of whether or not the user opens the door 600. While the air cleaning mode is in operation, the user can freely open the door 600 to place clothes or the like inside the storage room 100 or take out clothes or the like. At any time, water may be filled in the supply water reservoir 270 and the water in the condensate water reservoir 280 may be discharged. Since the door 600 does not cover the intake port 210 and the exhaust port 250 is opened from the inside of the door 600, opening of the door 600 does not affect the operation of the air cleaning mode.

Even when the user is at a remote distance from the multi-functional storage system, that is, at a location where the user is not easily able to see the control unit 610, by checking only whether or not the exhaust door 650 is open, the user is able to know whether it is the air cleaning mode or the clothing management mode.

Even when the filter is contaminated as the operation continues during the air cleaning mode or the clothing management mode, the user can easily replace the filter. In the case of the clean filter unit 219, the user can reach his/her hand to the intake port 210 below the door 600 and can easily replace the same. In the case of the circulation filter unit 229, the user can replace the same by opening the door 600 and using the circulation filter detaching part 129.

Description of Recirculation Module

Figure 8:
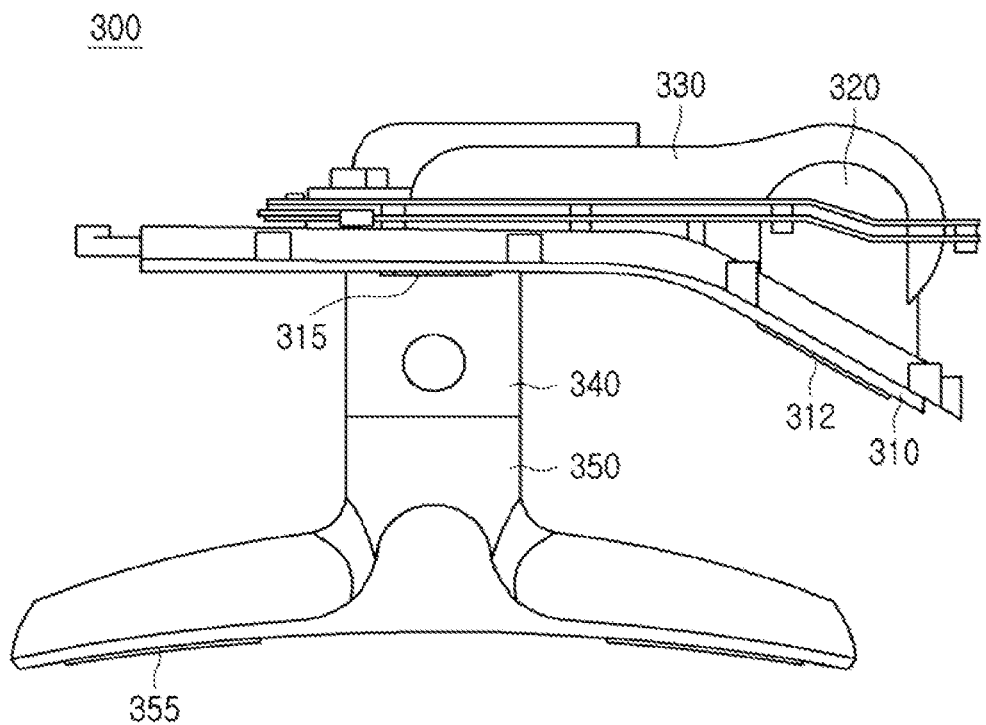
FIG. 8 is a right side view of the recirculation module of the multi-functional storage system according to the present invention.
Figure 9:
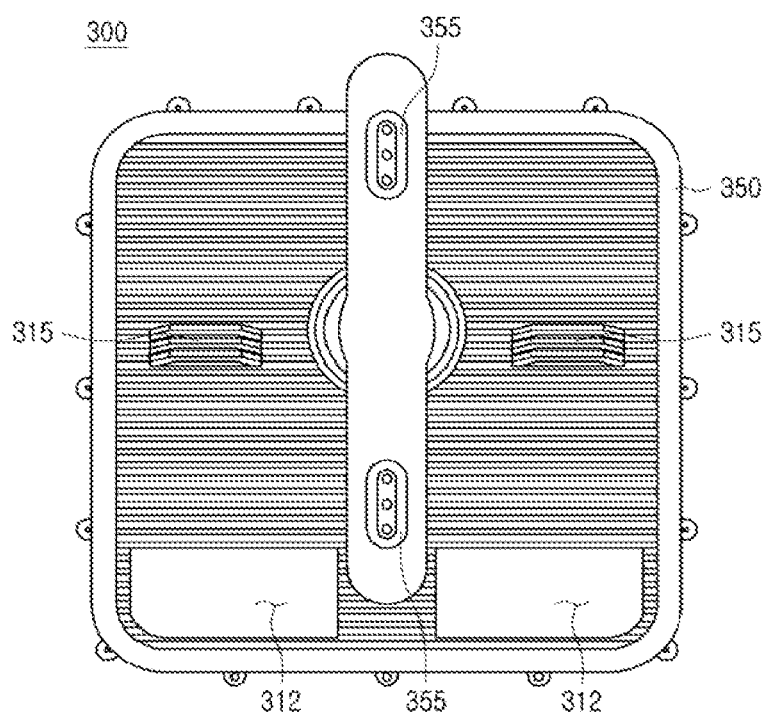
FIG. 9 is a bottom view of the recirculation module of the multi-functional storage system according to the present invention.
Figure 10:
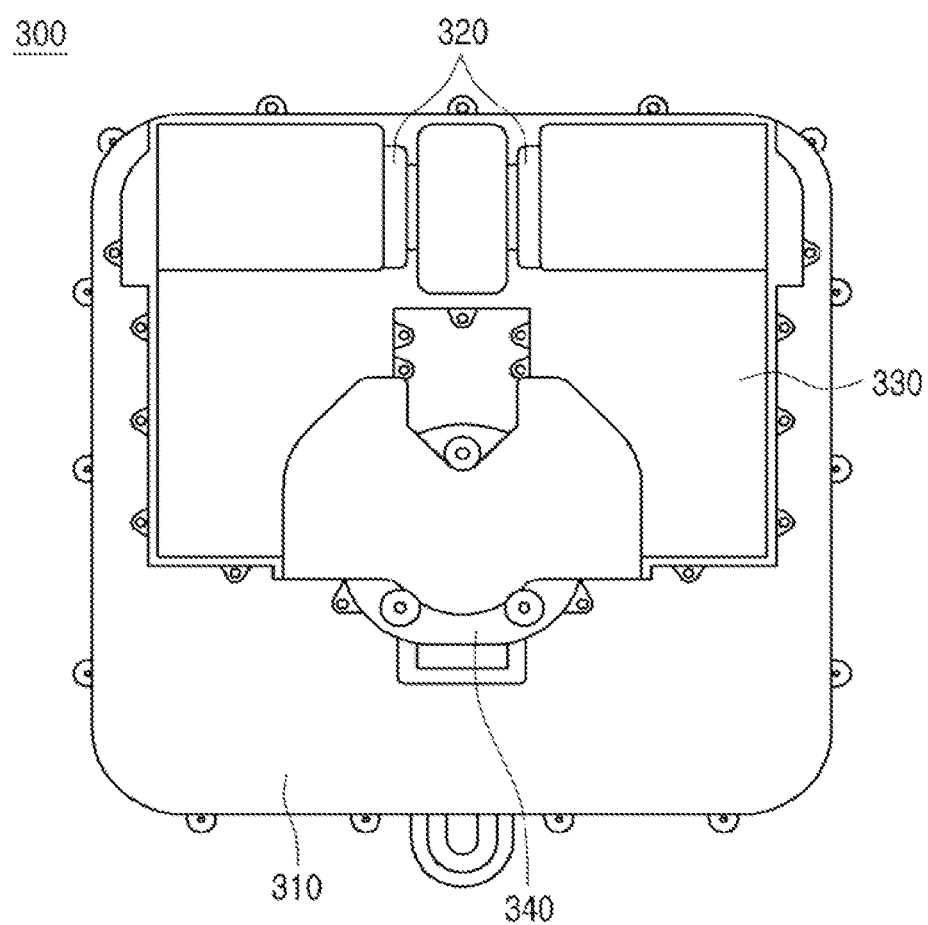
FIG. 10 is a plan view of the recirculation module of the multi-functional storage system according to the present invention.

The recirculation module 300 of the multi-functional storage system according to the present invention will be described with reference to FIGS. 8 to 10.

As described above, in the "clothing management mode", the storage room 100 is blocked from an outside air and the internal air is continuously circulated, thereby removing contaminants or malodorous substances from clothes or the like. In order to increase the removal effect, the circulation air needs to be circulated more efficiently inside the storage room 100. Since the storage room 100 has an extended length to store clothes, the air discharged from the machine room 200 may be circulated through convection in the space adjacent to the machine room 200, but the air may stagnate in the opposite space, and accordingly, a recirculation module 300 is provided to assist circulation.

The recirculation module 300 is positioned on, and in fluid communication with the recirculation module mounting part 130, which is an opening positioned on one side of the storage room 100. It is preferable that the one side is the opposite side facing the machine room 200. For example, when the machine room 200 is positioned on the lower side of the storage room 100, the recirculation module mounting part 130 and the recirculation module 300 may preferably be positioned on the upper side.

The recirculation module 300 includes a recirculation module frame 310, a recirculation blower unit 320, a recirculation flow path 330, an air shot hanger mounting part 340, and an air shot hanger 350.

The recirculation module frame 310 is a frame that covers the recirculation module mounting part 130 and that supports the recirculation module 300.

The recirculation module frame 310 includes a first parallel surface positioned at a front side, and a second surface positioned at a rear side and bent downward. In other words, it has a shape tapered to the rear. Since it may be configured such that the recirculation intake port 312 is positioned on the tapered second surface, there is an advantage that the circulation air is guided to be sucked in the direction of convection as it is, and this helps to provide a more efficient air circulation. In addition, since a larger space is generated above the tapered second surface, the recirculation blower unit 320 having a relatively large size can be positioned, and there is an advantage in that the space occupied by the recirculation module 300 can be reduced and the storage space can be increased. That is, the upper surface of the recirculation flow path 330 positioned above the recirculation module 300 may be configured to be substantially parallel from the front end to the opposite end of the recirculation blower unit 320, such that the space between the upper portion of the storage room 100 and the casing 500 is utilized as much as possible.

A plurality of recirculation intake ports 312 and a plurality of recirculation discharge ports 315 are positioned on a lower surface of the recirculation module frame 310. In the drawing, both the recirculation intake port 312 and the recirculation discharge port 315 are shown as two, but are not limited to this number. As described above, the recirculation intake ports 312 are preferably positioned on the tapered second surface along the direction of convection inside the storage room 100.

The recirculation blower unit 320 provides power to suck in and discharge the circulation air. As described above, it is preferably positioned above the rear side of the recirculation module frame 310. The recirculation intake ports 312 are positioned on the intake side of the recirculation blower unit 320. The discharge port side of the recirculation blower unit 320 is in fluid communication with the inside of the recirculation flow path 330.

The recirculation flow path 330 is an upper surface of the recirculation module frame 310 and is positioned outside the storage room 100. That is, it is hidden inside the storage room 100 so that the user cannot see the same. The recirculation flow path 330 is in fluid communication with the recirculation intake ports 312 through the recirculation blower unit 320, in fluid communication with the recirculation discharge ports 315 through the recirculation frame 310, and in fluid communication with the air shot discharge port 355 through the air shot hanger mounting part 340 and the air shot hanger 350.

The air shot hanger mounting part 340 is positioned in the center of the recirculation module frame 310 and in the center of the storage room 100. The upper end of the air shot hanger mounting part 340 is communicated with the recirculation flow path 330, and the air shot hanger 350 is detachably mounted at the lower end of the air shot hanger mounting part 340. That is, the air shot hanger mounting part 340 is protruded downward from the recirculation module frame 310, has a hollow shape, and is communicated with the front end portion of the recirculation flow path 330.

The air shot hanger 350 has a hollow shape and an inverted Y shape to perform a hanger function. A pair of air shot discharge ports 355 are positioned to face downward from both ends of the inverted Y-shape. That is, the circulation air sucked from the recirculation intake port 312 by the recirculation blower unit 320 is passed through the recirculation flow path 330, the hollow air shot hanger mounting part 340, and the air shot hanger 350, and is discharged from the air shot discharge port 355. Since the circulation air is discharged from the air shot discharge port 355, when there are clothes or the like hung on the air shot hanger 350, there is an advantage of removing contaminants or malodorous substances from the inside of the clothes or the like and improving creases. When there are no clothes or the like, the circulation air is directly discharged into the storage room 100, which assists the circulation of circulation air. When the air shot hanger 350 is detached from the air shot hanger mounting part 340, the circulation air is discharged to the lower surface of the air shot hanger mounting part 340, which also assists the circulation.

It is preferable that the recirculation module 300 operate in the clothing management mode and stop in the air cleaning mode.

During operation of the clothing management mode, the air inside the storage room 100 is circulated through the machine room 200 and the recirculation module 300 as the circulation air. Specifically, while the storage room 100 is blocked from the outside air, after heating (or simultaneously upon heating) of the machine room 200 by the heating unit 260, the air inside the storage room 100 is flowed into the machine room 200, supplied with moisture by the circulation filter unit 229 to become a natural humidified air, and then flowed back into the storage room 100 as the circulation air, and at this time, the recirculation module 300 is operated to recirculate the circulation air.

During operation of the air cleaning mode, it would be sufficient if the air flowed into the machine room 200 through the intake port 210 is filtered by the clean filter unit 219 and then discharged through the exhaust port 250, and accordingly, the storage room 100 is blocked from fluid communication with the machine room 200 and the operation of the recirculation module 300 is stopped.

In the above, the present invention is described with reference to the embodiments shown in the drawings to enable those skilled in the art to easily understand and reproduce the present invention, but this is merely exemplary, and those skilled in the art will be able to understand that various modifications and equivalent other embodiments are possible from the embodiments of the present invention. Therefore, the scope of protection of the present invention should be determined by the claims.

DESCRIPTION OF REFERENCE NUMERALS

100: storage room
129: circulation filter detaching part
130: recirculation module mounting part
141: circulation air inlet
142: circulation air outlet
147: functional material receiving part
200: machine room
210: intake port
218: clean filter unit detaching part
219: clean filter unit
220: first flow path
229: circulation filter unit
230: blower unit
240: second flow path
241: first flow path switching member
242: second flow path switching member
250: exhaust port
260: heating unit
270: supply water reservoir
280: condensate water reservoir
300: recirculation module
310: recirculation module frame
312: recirculation intake port
315: recirculation discharge port
320: recirculation blower unit
330: recirculation flow path
340: air shot hanger mounting part
350: air shot hanger
355: air shot discharge port
500: casing
600: door
610: controller
650: exhaust door

The invention claimed is:

1. A multi-functional storage system, comprising:
a storage room;
a machine room, which is provided on a side of the storage room, comprising flow paths positioned to be in fluid communication with the storage room;
a circulation filter unit filtering an air introduced into the flow paths;
a blower unit circulating the air that passes through the flow paths; and
a recirculation module positioned on and in fluid communication with a recirculation module mounting part, which is an opening positioned on a different side than the side of the storage room,
wherein the recirculation module comprises:
a recirculation module frame covering the recirculation module mounting part;
an air shot hanger mounted on the recirculation module frame;
a plurality of recirculation intake ports positioned on the recirculation module frame;
a plurality of recirculation discharge ports positioned on the recirculation module frame;
one or more air shot discharge ports positioned on a bottom surface of the air shot hanger;
a recirculation flow path positioned to be in fluid communication with the recirculation intake ports, the recirculation discharge ports, and air shot discharge ports; and
a recirculation blower unit circulating the air that passes through the recirculation flow path,
wherein the flow paths and the recirculation flow path are separated from one another based on the storage room.

2. The multi-functional storage system according to claim 1, wherein
the other side is an upper surface of the storage room, and
the recirculation flow path is positioned on an upper surface of the recirculation module frame outside the storage room.

3. The multi-functional storage system according to claim 2, wherein
the recirculation module frame comprises a first surface extending in parallel,
a second surface positioned at a rear side of the recirculation module frame compared to the first surface and bent downward, and
the plurality of recirculation intake ports are positioned on the second surface.

4. The multi-functional storage system according to claim 3, wherein
the recirculation blower unit is positioned above the second surface, as an upper side of the plurality of recirculation intake ports.

5. The multi-functional storage system according to claim 4, wherein
an upper surface of the recirculation flow path is parallel from a front end of the recirculation flow path to a front end of the recirculation blower unit.

6. The multi-functional storage system according to claim 2, wherein
the recirculation module further comprises an air shot hanger mounting part which is protruded downward from the recirculation module frame, has a hollow shape, and is communicated with a front end portion of the recirculation flow path, and
the air shot hanger is attachable to or detachable from the air shot hanger mounting part.

7. The multi-functional storage system according to claim 6, wherein
the air shot hanger has an inverted Y shape, and
the air shot discharge ports are provided in pairs and positioned to face downward at both ends of an inverted Y-shape, respectively.

8. The multi-functional storage system according to claim 1, wherein
an air inside the storage room is circulated as a circulation air through the machine room and the recirculation module.

9. The multi-functional storage system according to claim 8, wherein
a heating unit is positioned in the machine room, and
when the multi-functional storage system is operated in a clothing management mode,
while the storage room is blocked from an outside air, the machine room is heated by the heating unit, and then the air inside the storage room is flowed into the machine room, supplied with moisture by the circulation filter unit to become a natural humidified air, and then flowed back into the storage room as the circulation air, and the recirculation module is operated to recirculate the circulation air.

10. The multi-functional storage system according to claim 9, wherein
an intake port, an exhaust port, and a clean filter unit are positioned in the machine room, and
when the multi-functional storage system is operated in an air cleaning mode, an air flowed into the machine room through the intake port is filtered by the clean filter unit and then discharged through the exhaust port.

11. The multi-functional storage system according to claim 10, wherein, when the multi-functional storage system is operated in the air cleaning mode,
the storage room is blocked from the fluid communication with the machine room, and
an operation of the recirculation module is stopped.

* * * * *